US012305984B2

(12) United States Patent
Kikuchi

(10) Patent No.: US 12,305,984 B2
(45) Date of Patent: May 20, 2025

(54) ERROR PREDICTION APPARATUS AND ERROR PREDICTION METHOD

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 469 days.

(21) Appl. No.: 17/970,245

(22) Filed: Oct. 20, 2022

(65) Prior Publication Data

US 2023/0126808 A1 Apr. 27, 2023

(30) Foreign Application Priority Data

Oct. 21, 2021 (JP) ................................. 2021-172628

(51) Int. Cl.
*G01C 15/00* (2006.01)
*G01W 1/10* (2006.01)
*G06F 11/07* (2006.01)

(52) U.S. Cl.
CPC ............... *G01C 15/00* (2013.01); *G01W 1/10* (2013.01); *G06F 11/0706* (2013.01)

(58) Field of Classification Search
CPC .... G01C 15/00; G01C 15/002; G01C 15/004; G01C 15/006; G01C 15/008; G01C 15/02
USPC ........................................... 33/286, 290–294
See application file for complete search history.

(56) References Cited

U.S. PATENT DOCUMENTS

| | | | | |
|---|---|---|---|---|
| 7,304,729 | B2* | 12/2007 | Yasutomi ................. | G01C 1/02 356/141.3 |
| 7,689,032 | B2* | 3/2010 | Strassenburg-Kleciak ................. | G06T 15/04 382/284 |
| 7,792,938 | B2* | 9/2010 | Kikuchi .............. | H04L 12/1822 709/223 |
| 8,749,763 | B2* | 6/2014 | Sakimura ............. | G01C 15/002 356/3.01 |
| 9,513,107 | B2* | 12/2016 | Zweigle ............... | G05D 1/0274 |
| 9,687,950 | B2* | 6/2017 | Kahle ..................... | B23Q 17/24 |
| 11,126,701 | B2* | 9/2021 | Kikuchi ............. | H04L 63/0861 |
| 11,435,182 | B2* | 9/2022 | Hajmousa ............. | G01C 15/06 |
| 11,435,445 | B2* | 9/2022 | Snyder ................. | G01C 15/002 |
| 12,152,883 | B2* | 11/2024 | Kikuchi ................. | G06F 30/13 |

(Continued)

FOREIGN PATENT DOCUMENTS

JP 60-086409 A 5/1995

*Primary Examiner* — George B Bennett
(74) *Attorney, Agent, or Firm* — Studebaker Brackett PLLC

(57) ABSTRACT

Provided is an error prediction apparatus including at least one processor and at least one memory configured to receive environment data of a surveying site in which a surveying instrument is installed, to input the environment data of the surveying site into an error prediction model and predict a predicted error that occurs in a surveying result obtained by the surveying instrument under an environment of the surveying site, and to create display data for displaying the predicted error when the predicted error exceeds an allowable value. The error prediction model is a learned model created by machine learning for a surveying instrument of the same model as the surveying instrument by using a set of the environment data indicating an environment of the time of surveying and error data in a surveying result as teacher data.

14 Claims, 19 Drawing Sheets

(56) References Cited

U.S. PATENT DOCUMENTS

2023/0106629 A1\* 4/2023 Kikuchi ............... G01C 15/002
                                                    356/72
2024/0151529 A1\* 5/2024 Fonken .................... G06T 7/70
2024/0193069 A1\* 6/2024 Kikuchi ................. G06N 20/20
2024/0384988 A1\* 11/2024 Zeh ...................... G01D 5/3473

\* cited by examiner

| Environment data | Environment sensor | Type of environment sensor | Environment to be considered |
|---|---|---|---|
| Ambient temperature data | Ambient temperature sensor | Ambient environment sensor | Temperature in surveying site |
| Ambient humidity data | Ambient humidity sensor | Ambient environment sensor | Humidity in surveying site |
| Ambient atmospheric pressure data | Ambient atmospheric pressure sensor | Ambient environment sensor | Atmospheric pressure in surveying site |
| Tilt degree data | Tilt sensor | Ambient environment sensor | Tilt degree (levelness) of surveying instrument |
| Tilt stabilization time data | Tilt sensor | Ambient environment sensor | Stable state of ground at installation position |
| Visibility data | Visibility meter | Ambient environment sensor | Mist, fog, and like in surveying site |
| Internal temperature data | Internal temperature sensor | Internal environment sensor | Temperature inside surveying instrument |
| Internal humidity data | Internal humidity sensor | Internal environment sensor | Humidity inside surveying instrument |
| Internal atmospheric pressure data | Internal atmospheric pressure sensor | Internal environment sensor | Atmospheric pressure inside surveying instrument |
| Internal/external humidity difference data | Ambient humidity sensor, Internal humidity sensor | Ambient environment sensor Internal environment sensor | Internal/external humidity difference of surveying instrument |

FIG. 3

| No. | Surveying instrument ID | Model | Ambient temperature (°C) | Ambient humidity (%) | Ambient atmospheric pressure (hPa) | Tilt degree (°) | Tilt stabilization time | Visibility (m) | Internal temperature (°C) | Internal humidity (%) | Internal atmospheric pressure (hPa) | Internal/external humidity difference (%) | Angle error (%) | Distance error (%) |
|---|---|---|---|---|---|---|---|---|---|---|---|---|---|---|
| 1 | TS01234 | G-0142 | xx | xx | xx | xx | xx | xx | xx | xx | xx | xx | xx | xx |
| 2 | TS00124 | G-0142 | xx | xx | xx | xx | xx | xx | xx | xx | xx | xx | xx | xx |
| 3 | TS00123 | G-0142 | xx | xx | xx | xx | xx | xx | xx | xx | xx | xx | xx | xx |
| 4 | TS00175 | G-0142 | xx | xx | xx | xx | xx | xx | xx | xx | xx | xx | xx | xx |
| 5 | TS00421 | G-0142 | xx | xx | xx | xx | xx | xx | xx | xx | xx | xx | xx | xx |
| 6 | TS00084 | G-0142 | xx | xx | xx | xx | xx | xx | xx | xx | xx | xx | xx | xx |
| 7 | TS00451 | G-0142 | xx | xx | xx | xx | xx | xx | xx | xx | xx | xx | xx | xx |
| 8 | TS00175 | G-0142 | xx | xx | xx | xx | xx | xx | xx | xx | xx | xx | xx | xx |
| 9 | TS00425 | G-0142 | xx | xx | xx | xx | xx | xx | xx | xx | xx | xx | xx | xx |

Environment data 91 / Error data 92

FIG. 12

| Order | Environment data (explanatory variable) | | Contribution degree |
|---|---|---|---|
| 1 | Tilt stabilization time (sec) | XX | 0.68 |
| 2 | Tilt degree (") | XX | 0.58 |
| 3 | Ambient temperature (°C) | XX | 0.10 |
| 4 | Internal temperature (°C) | XX | 0.08 |
| 5 | Ambient humidity (%) | XX | 0.05 |
| 6 | Internal humidity (%) | XX | 0.05 |
| 7 | Ambient atmosphere pressure (hPa) | XX | 0.04 |
| 8 | Visibility (m) | XX | 0.02 |
| 9 | Internal atmospheric pressure (hPa) | XX | 0.01 |
| 10 | Internal/external humidity difference (%) | XX | 0.01 |

FIG. 13

| Time | Temperature (°C) | Humidity (%) | Atmospheric pressure (hPa) |
|---|---|---|---|
| 12:30-13:00 | XX | XX | XX |
| 13:00-13:30 | XX | XX | XX |
| 13:30-14:00 | XX | XX | XX |
| 14:00-14:30 | XX | XX | XX |
| 14:30-15:00 | XX | XX | XX |
| 15:00-15:30 | XX | XX | XX |
| 15:30-16:00 | XX | XX | XX |
| 16:00-16:30 | XX | XX | XX |
| 16:30-17:00 | XX | XX | XX |
| 17:00-17:30 | XX | XX | XX |
| 17:30-18:00 | XX | XX | XX |
| 18:00-18:30 | XX | XX | XX |

— 95

ERROR PREDICTION APPARATUS AND ERROR PREDICTION METHOD

CROSS-REFERENCE TO RELATED APPLICATION, BENEFIT CLAIM, AND INCORPORATION BY REFERENCE

The present disclosure claims priority under 35 U.S.C. § 119 to Japanese Patent Application No. 2021-172628 filed Oct. 21, 2021. The contents of this application are incorporated herein by reference in their entirely.

TECHNICAL FIELD

The present invention relates to an error prediction apparatus and an error prediction method. More particularly, the present invention relates to an error prediction apparatus and an error prediction method that predict environment-dependent errors in measured values obtained by a surveying instrument.

BACKGROUND ART

Conventionally, it is known that environmental factors such as temperature, humidity, and atmospheric pressure have influence on errors in measured values in surveying instruments such as total stations, laser scanners, electronic levels, and theodolites.

For example, Patent Literature 1 discloses a surveying instrument that is configured to compute an error according to an environment temperature and corrects a distance-measuring signal.

CITATION LIST

Patent Literature

Patent Literature 1: Japanese Published Unexamined Patent Application No. S60-86409

SUMMARY OF INVENTION

Technical Problem

Conventionally, however, the worker recognizes an error after measurement. For this reason, upon recognizing that an error exceeds an allowable range after measurement, the worker needs to perform measurement again after analyzing the cause and adjusting the surveying instrument. Accordingly, there has been a demand for knowing in advance whether the error exceeds the allowable range. When using a scanner, in particular, it is desirable to know the state of the scanner in advance before measurement because it takes a lot of time for one measurement. In addition, if an error occurs, it sometimes takes a lot of time to identify the cause. This has increased demand to know the state of operation in advance. Furthermore, if an error falls within the allowable range, the surveying instrument automatically corrects the error. This makes it impossible for the worker to recognize that the surveying instrument is in an environment condition under which the error has occurred.

The present invention has been made in consideration of such circumstances and has an object to provide a technique for enabling a worker to recognize, in advance, an error that may occur in measurement by a surveying instrument.

Solution to Problem

In order to achieve the above object, an error prediction apparatus according to one aspect of the present invention includes a control arithmetic unit having at least one processor and at least one memory. The control arithmetic unit configured to receive environment data of a surveying site in which a surveying instrument is installed, to input the environment data of the surveying site into an error prediction model and predict a predicted error that occurs in a surveying result obtained by the surveying instrument under an environment of the surveying site, and to create display data for displaying the predicted error when the predicted error exceeds an allowable value. The error prediction model is a learned model created by machine learning for a surveying instrument of the same model as that of the surveying instrument by using a set of the environment data indicating an environment of the time of surveying and error data in a surveying result as teacher data.

In an error prediction method according to another aspect of the present invention, including the steps of, by an arithmetic control unit including at least one processor and at least one memory, acquiring environment data of a surveying site in which a surveying instrument is installed, inputting the environment data of the surveying site into an error prediction model and predicts a predicted error that occurs in a surveying result obtained by the surveying instrument under an environment of the surveying site, and creating a display for displaying the predicted error when the predicted error exceeds an allowable value. The error prediction model is a learned model created by machine learning for a surveying instrument of the same model as that of the surveying instrument by using a set of the environment data indicating an environment of the time of surveying and an error in a surveying result as teacher data.

Benefits of Invention

According to the error prediction apparatus and error prediction method according to the above aspects, the worker can recognize, in advance, an error that may occur in measurement by a surveying instrument.

BRIEF DESCRIPTION OF DRAWINGS

FIG. 3 is a table illustrating an example of an environment sensor constituting the error prediction apparatus.

FIG. 12 is a view illustrating an example of teacher data for predicted error used in the same error prediction apparatus.

FIG. 13 is a view illustrating an example of the contribution degree data of environment data in the same error prediction apparatus.

DESCRIPTION OF EMBODIMENTS

Figure 1:
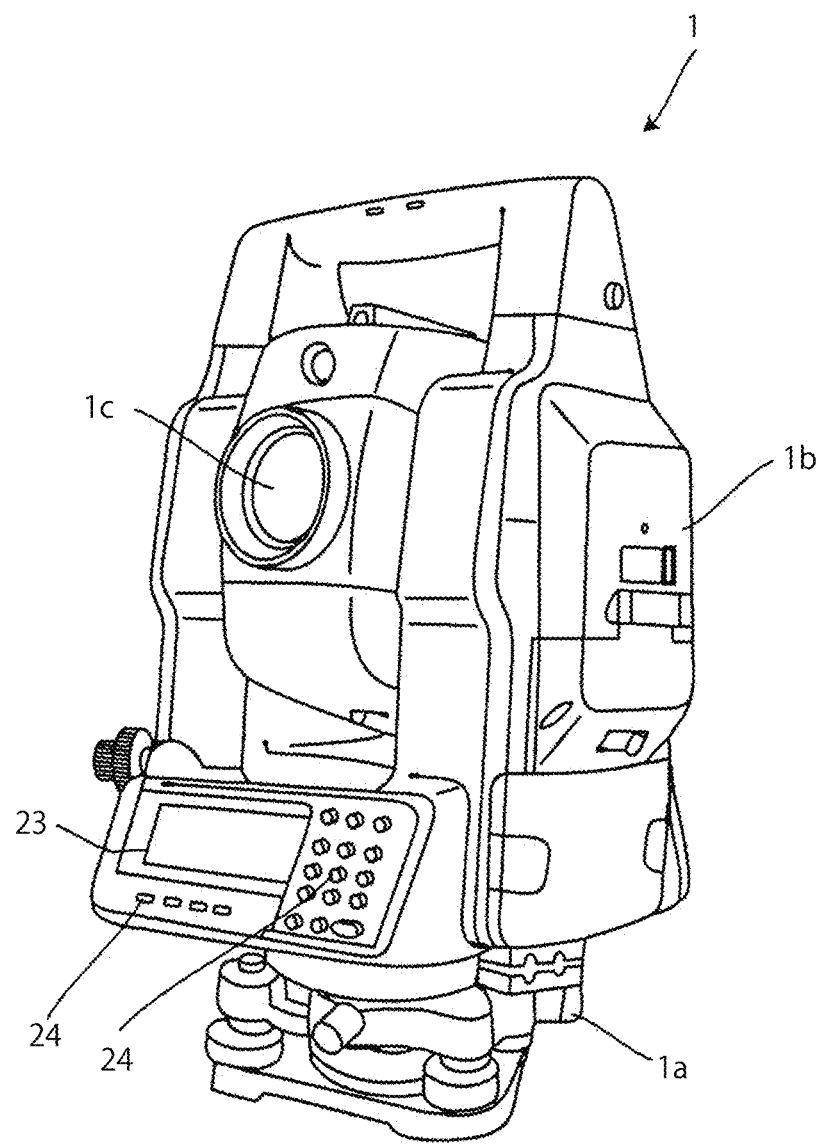
FIG. 1 is an external perspective view of a surveying instrument as an error prediction apparatus according to a first embodiment of the present invention.

Hereinafter, preferred embodiments of the present invention will be described with reference to the accompanying drawings. However, the present invention is not limited to these. The same components common to the embodiments and respective modifications will be denoted by the same reference numerals and symbols, and any overlapping description will be omitted as appropriate.

I. First Embodiment

1. Error Prediction Apparatus

Figure 2:
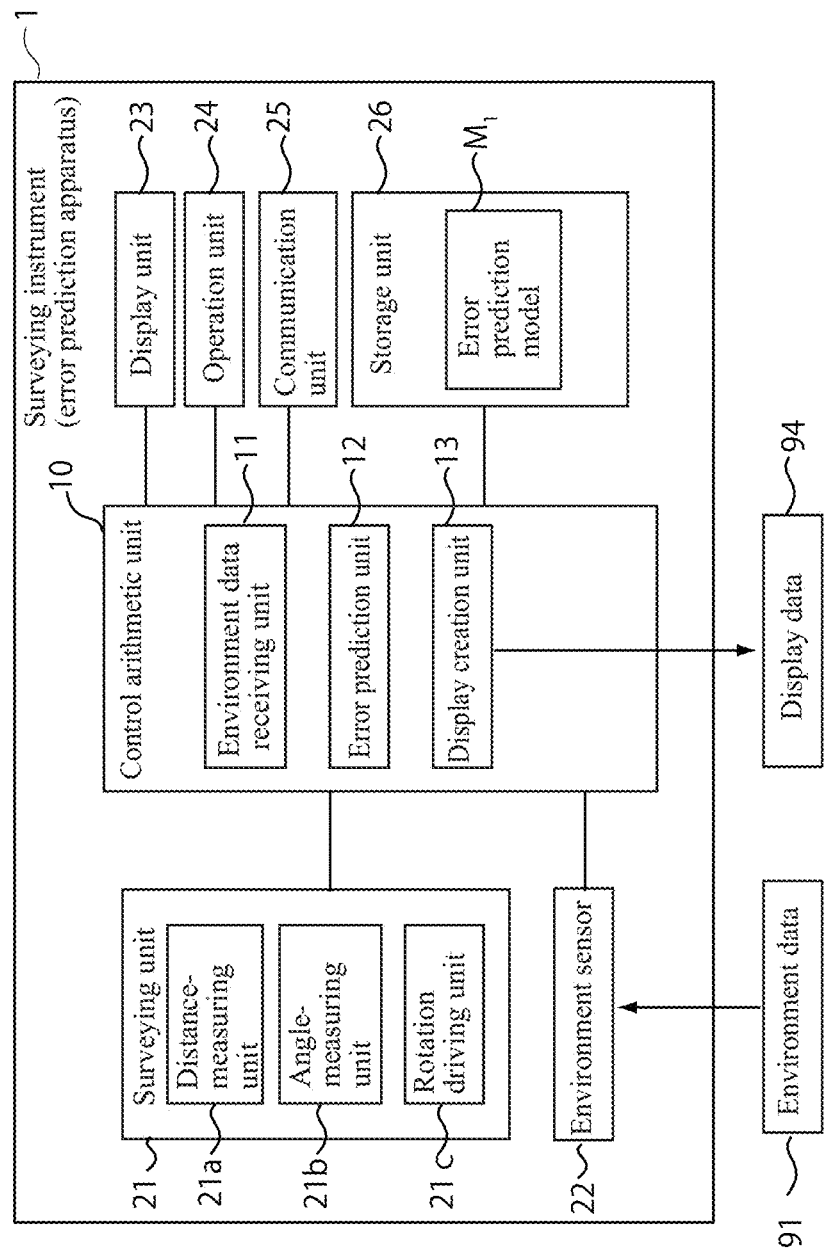
FIG. 2 is a block diagram illustrating the configuration of the error prediction apparatus.

FIG. 1 is an external schematic view of an error prediction apparatus (hereinafter simply referred to as a "prediction apparatus") according to the first embodiment of the present invention. FIG. 2 is a block diagram illustrating the configuration of the prediction apparatus. The prediction apparatus is a surveying instrument 1. The example illustrated in FIG. 2 is a motor driven total station installed at a surveying site via a tripod.

The surveying instrument 1 includes a control arithmetic unit 10, a surveying unit 21, an environment sensor 22, a display unit 23, an operation unit 24, a communication unit 25, and a storage unit 26. Besides these, the surveying instrument 1 may also include a tracking unit that automatically tracks a target, an image processing unit that processes captured images and moving images, and a GNSS receiver, etc.

The surveying unit 21 includes a distance-measuring unit 21a, an angle-measuring unit 21b, and a rotation driving unit 21c. The distance-measuring unit 21a includes a light-emitting element, a distance-measuring optical system, and a light-receiving element (not illustrated) which are disposed in a telescope 1c. The distance-measuring unit 21a measures the distance to a target by irradiating the target with distance-measuring light emitted from the light-emitting element via the distance-measuring optical system and receiving a reflected light from the target by the light-receiving element.

The angle-measuring unit 21b measures the horizontal angle and vertical angle to a target by measuring a vertical rotation angle of the telescope 1c and a horizontal rotation angle of a bracket portion 1b with respect to a base portion 1a with a rotary encoder (not illustrated) disposed on each rotation axis.

The rotation driving unit 21c is a motor, which is controlled by the control arithmetic unit 10 to drive the rotation shafts of the telescope 1c and the bracket portion 1b.

The environment sensor 22 is a sensor that acquires environment data 91 by detecting an environment of a measurement site. The environment of the surveying site may include an environment around the surveying instrument 1 and an environment inside the surveying instrument 1. FIG. 3 illustrates examples of the environment data 91 and the environment sensor 22.

An ambient temperature sensor is a temperature sensor that measures the outside temperature around the surveying instrument 1. An ambient humidity sensor is the humidity sensor that measures the humidity around the surveying instrument 1. An ambient atmospheric pressure sensor is a sensor that measures the atmospheric pressure around the surveying instrument 1. An internal temperature sensor is a temperature sensor that measures the temperature inside the surveying instrument 1. An internal humidity sensor is a sensor that measures the humidity inside the surveying instrument 1. An internal atmospheric pressure sensor is a sensor that measures the atmospheric pressure inside the surveying instrument 1.

A tilt sensor is, for example, a so-called optical tilt sensor that includes an electric bubble tube, a light source, a light-receiving element, and a control means. The tilt sensor is configured to cause light from the light source to be transmitted through the electric bubble tube, receive the light by the light-receiving element, and make the control arithmetic unit 10 calculate a tilt angle based on the light reception signal. The tilt sensor is provided in relation to at least two axes of the surveying instrument 1, namely, the X-axis and the Y-axis perpendicular to the X-axis. The tilt sensor acquires tilt degree data, which is the levelness (tilt degree) of the surveying instrument 1, from a detection value of the tilt sensor. The tilt sensor acquires tilt stabilization time data, which indicates a stable state of the ground at the installation position of the surveying instrument 1, from a stabilization time of the tilt sensor.

A visibility meter is, for example, a backward scattering visibility meter that includes a light projection unit that includes a light emitting diode (LED) and converges and outputs red visible light (wavelength: 620 nm), a light-receiving unit including a light-receiving element such as a photodiode, and a narrow-band filter. The backward scattering visibility meter projects emitted light through the narrow-band filter, detects a back-scattered light obtained when the light is scattered by minute scatterers included in the air, and makes the control arithmetic unit 10 calculate visibility from the light reception signal, thereby acquiring visibility data. It is possible to consider the presence/absence and degree of mist, fog, and the like based on the visibility data.

As described above, the environment data 91 may be the one that is acquired by a single environment sensor 22, as in the case in which ambient temperature data is acquired by the ambient temperature sensor. Alternatively, like internal/external humidity difference, this data may be the one calculated from the data acquired by two or more environment sensors 22. In addition, like the tilt sensor, the single environment sensor 22 may be configured to acquire two or more environment data 91.

Environment data and environment sensors need not include all the sensors and environment data exemplified above and can be used singly or in combination in accordance with the environment to be considered. The environment data to be used preferably include two or more types selected from ambient humidity data, ambient atmospheric pressure data, tilt degree data, tilt stabilization time data, internal temperature data, internal humidity data, internal/external humidity difference data, and wind speed data (not illustrated), light intensity data (not illustrated), and the like. The number and types of sensors to be included in the environment sensor 22 can be selected as appropriate.

The display unit 23 is, for example, a liquid crystal display. The operation unit 24 includes a power key, numeric keys, a decimal key, plus and minus keys, an enter key, and a scroll key, etc., and is configured to allow the worker to operate the surveying instrument 1 and input information to the surveying instrument 1.

The communication unit 25 is a communication controller such as a network adapter, a network interface card, or a LAN card and connects the surveying instrument 1 to a communication network such as the Internet or cell-phone network by wire or wirelessly. The control arithmetic unit 10 can input and output information to and from an external device via the communication unit 25 and the communication network.

The storage unit 26 is constituted by, for example, a computer-readable storage medium such as a memory card or hard disk drive (HDD). The storage unit 26 stores various types of programs for executing the functions of the surveying instrument 1. The storage unit 26 also stores the measurement data obtained by the surveying instrument 1, the detection data obtained by the environment sensor 22, and various types of information acquired by the surveying instrument 1. In addition, the storage unit 26 stores an error prediction model M corresponding to the model of the surveying instrument 1. The error prediction model M will be described later.

The control arithmetic unit 10 is, for example, a control arithmetic unit including one or a plurality of processors such as a central processing unit (CPU) and one or a plurality of memories such as a random access memory (RAM) and a read only memory (ROM). The control arithmetic unit 10 causes the processor to execute various types of processing by reading out necessary information (programs and data) from the storage unit 26 to the memory and executing the programs. The control arithmetic unit 10 is connected to each unit of hardware constituting the surveying instrument 1.

The control arithmetic unit 10 controls the surveying unit 21 to calculate the three-dimensional position coordinates of a measurement target based on measurement values obtained by performing distance measurement and angle measurement with respect to the measurement target. At this time, the control arithmetic unit 10 corrects the measurement values based on the environment data 91 acquired at the same time as the measurement or a predetermined timing. Based on the detection result obtained by the environment sensor 22, the control arithmetic unit 10 also acquires the corresponding environment data 91. In addition, the control arithmetic unit 10 includes, as functional units, an environment data receiving unit 11, an error prediction unit 12, and a display creation unit 13. The environment data receiving unit 11 receives the environment data 91 detected by the environment sensor 22.

The error prediction unit 12 inputs the environment data 91 into the error prediction model $M_1$ and predicts a predicted error that occurs in the measurement value of the surveying instrument 1 under the environment of the surveying site.

The display creation unit 13 creates display data 94 for displaying the predicted error.

Note that the surveying instrument 1 is not limited to the motor driven total station. The surveying instrument 1 may be an electronic level or the like that includes an image sensor as the surveying unit 21 and measures the height from an image pattern of a leveling staff. The surveying instrument 1 may be a three-dimensional laser scanner or the like that further includes a turning mirror provided for the surveying unit 21 to scan distance-measuring light 360° in the vertical direction with a vertical rotation driving unit, and acquires three-dimensional point group data.

2. Error Prediction Model

An error prediction model will be described below. The error prediction model is a learned model generated by machine learning for a surveying instrument of the same model as that of the surveying instrument 1 by using a set of environment data indicating an environment at the time of measurement and error data in a surveying result as teacher data. The error prediction model $M_1$ is generated by an error prediction model generating device 3.

2-1 Teacher Data

Figures 4, 5:
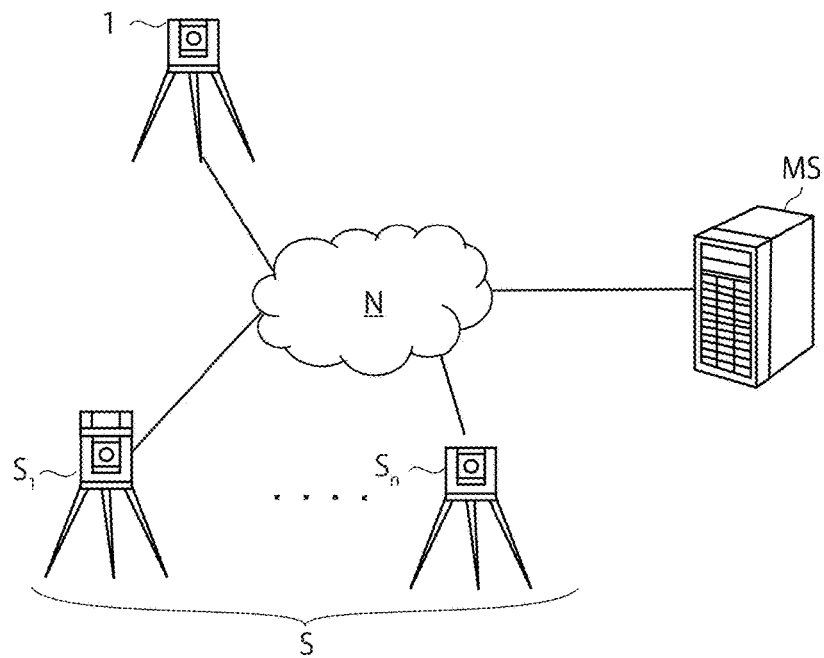
FIG. 4 is a view for explaining a management system for the surveying instrument as the error prediction apparatus.
FIG. 5 is a view illustrating an example of teacher data for generating an error prediction model used in the error prediction apparatus.

FIG. 4 is a view illustrating a management system for the surveying instrument 1 for collecting teacher data. The surveying instrument 1 is communicably connected to a management server MS that is managed by the administrator of the surveying instrument 1, such as the manufacturer of the surveying instrument 1, a distributor (dealer), or a management company. The surveying instrument 1 can transmit various data related to the surveying instrument 1, such as the measurement data acquired by the surveying instrument 1, the error data obtained by analyzing measurement values, environment data at the time of measurement, and log data, to the management server MS at predetermined intervals, in accordance with a predetermined operation such as measurement or power-on operation, according to a worker's instruction, or in response to a request from the management server MS in association with the identification information of the surveying instrument 1. The management server MS manages the received data from the surveying instrument 1 by making a database of the data in association with the identification information and model of the surveying instrument 1.

In addition to the surveying instrument 1, many surveying instruments $S_1$ to $S_n$ of the same model as that of the surveying instrument 1 or of different models and types (these are collectively referred to as other surveying instruments S hereinafter) are communicably connected to the management server MS. The management server MS collects and receives data from other surveying instruments S as well as the surveying instrument 1 and manages the data by making a database of the data in association with the identification information and model of each surveying instrument. The data collected by the management server MS from the surveying instrument 1 and other surveying instruments in this manner will be referred to as collected data hereinafter.

Alternatively, collected data may be those obtained by collecting measurement data, error data, and environment data at the time of measurement in association with the identification information and the models by repeating test surveying with respect to the surveying instrument 1 and other surveying instruments S in a factory or the like under various environments in which the environment data 91 is variously changed.

FIG. 5 is a view illustrating an example of teacher data. Teacher data is obtained by organizing the data collected in the above manner into a set of environment data and error data at the time of measurement according to the same model. The following shows an example of using internal temperature data, internal humidity data, and internal atmospheric pressure data as environment data. In addition, the following shows an example of using, as error data, errors in relation to a distance measurement value and an angle measurement value which are measurement values. Error data is handled as a ratio to a measurement value. Note that these environment data are preferably normalized when used.

2-2 Error Prediction Model Generating Device 3

Figure 6:
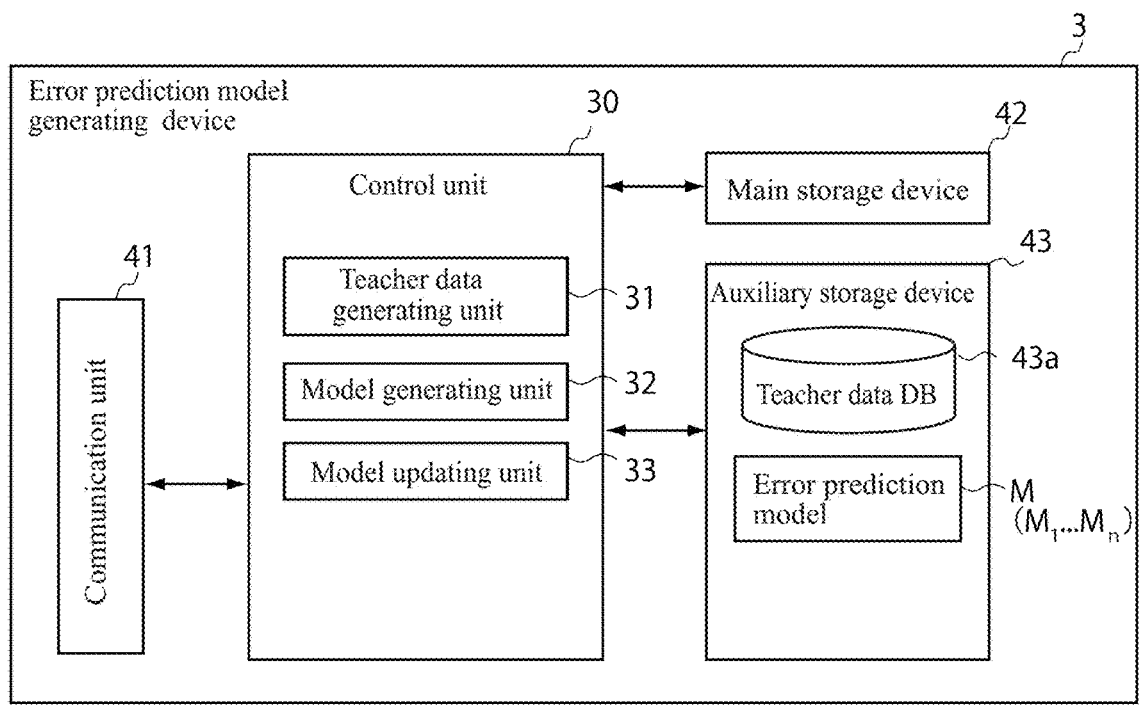
FIG. 6 is a block diagram illustrating the configuration of an error prediction model generating device that generates the error prediction model.

FIG. 6 is a block diagram illustrating the configuration of the error prediction model generating device 3. The error prediction model generating device 3 is a computer and includes a control unit 30, a communication unit 41, a main storage device 42, and an auxiliary storage device 43. The error prediction model generating device 3 may be a computer constituting the management server MS. Alternatively, the error prediction model generating device 3 may be a separate computer configured to be communicable with the management server MS via a communication network N.

The communication unit 41 is a communication controller such as a network adapter, a network interface card, or a LAN card and connects the error prediction model generating device 3 to the communication network N by wire or wirelessly. The control unit 30 can transmit and receive various types of information to and from the management server MS and other external devices via the communication network N.

The control unit 30 is a control arithmetic unit constituted by one or a plurality of processors such as a central processing unit (CPU), multi-core CPU, or graphics processing unit (GPU) and one or a plurality of memories such as a RAM and a ROM. The control unit 30 is connected to each unit of hardware constituting the error prediction model generating device via a bus.

The control unit 30 includes, as functional units, a teacher data generating unit 31, a model generating unit 32, and a model updating unit 33.

The teacher data generating unit 31 generates teacher data as a data set including environment data at the time of measurement as an explanatory variable and error data at the time of measurement as an objective variable for each same model from the data collected by the management server MS and stores the generated teacher data as a teacher data database (DB) 43a in the auxiliary storage device 43.

The model generating unit 32 reads out teacher data for a surveying instrument of the same model from the teacher data DB 43a and performs machine learning using a set of environment data and error data at the time of measurement, thereby generating an error prediction model M. The generated error prediction model M is stored in the auxiliary storage device 43. The model generating unit 32 generates error prediction models $M_1, M_2, \ldots, M_n$ (in this case, n is a natural number indicating the number of models, $M_x$ indicates a specific model, and M generically indicates models as a whole). The respective error prediction models are stored in the auxiliary storage device 43.

Machine learning can be implemented by, for example, a neural network using one or a plurality of layers of a nonlinear unit for predicting an output with respect to an input. More specifically, machine learning can use techniques such as a deep neural network (DNN), a convolutional neural network (CNN), and a recurrent neural network (RNN).

Alternatively, a technique such as support vector regression (SVR), random forest, or Bayesian linear regression analysis may be used for machine learning.

Upon receiving newly collected data from the management server MS, the model updating unit 33 generates teacher data using environment data at the time of measurement which is included in the newly collected data and error data at the time of measurement as a set. The model updating unit 33 then updates an error prediction model $M_x$ by re-learning an error prediction model $M_x$ of the model with which the data is associated using the same technique as that used at the time of model generation.

Figure 7:
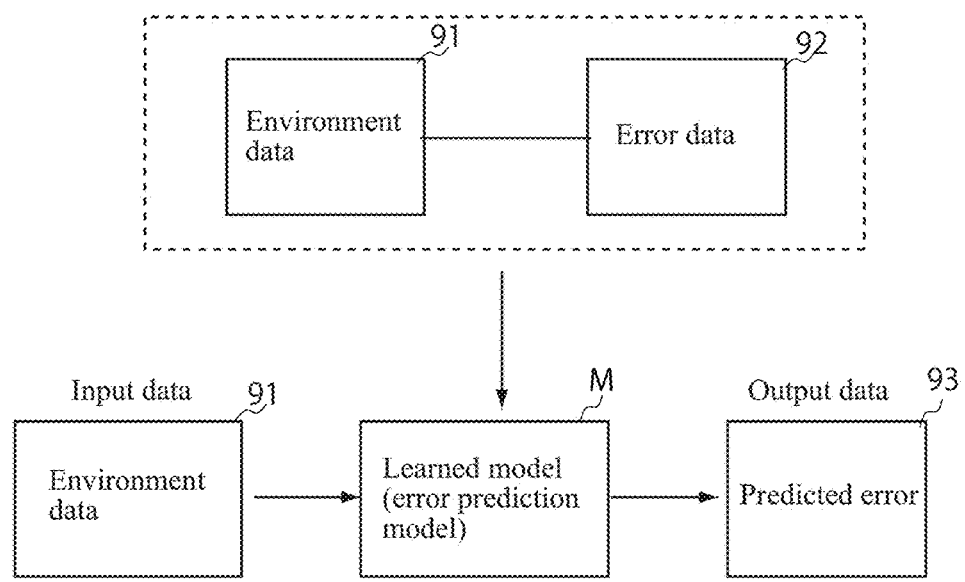
FIG. 7 is a view for explaining an outline of error prediction by the error prediction apparatus.

As schematically illustrated in FIG. 7, the error prediction model generating device 3 generates a learned model by machine learning using a set of the environment data 91 at the time of measurement and error data 92 at the time of measurement. This makes it possible to generate an error prediction model that can predict an error in surveying by the surveying instrument of the same model under the environment indicated by the environment data with respect to an input from the environment data 91.

3. Error Prediction Method

Figure 8:
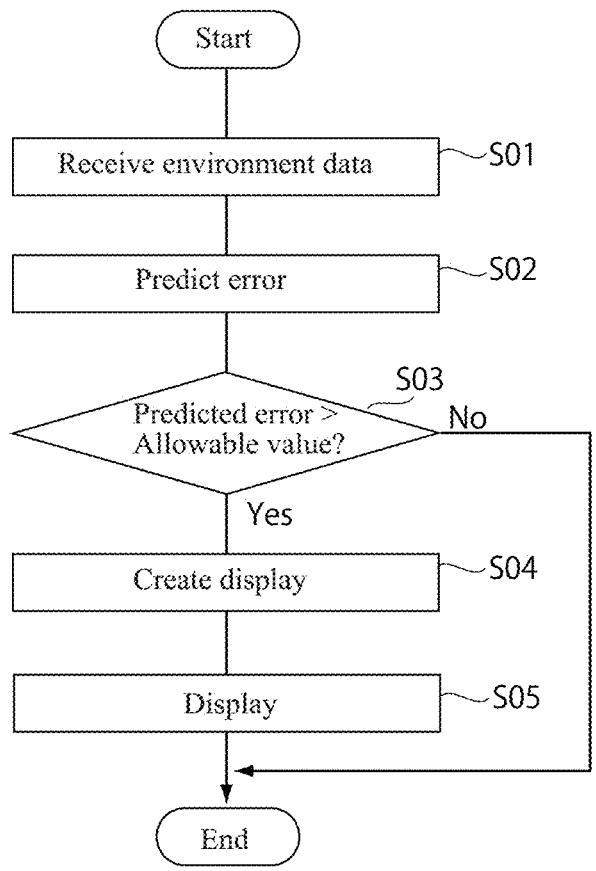
FIG. 8 is a flowchart of processing for error prediction by the error prediction apparatus.

FIG. 8 is a flowchart of processing by an error prediction method by the error prediction apparatus (surveying instrument 1) according to this embodiment. Although error prediction is preferably executed at the start time of surveying work in one day, error prediction may be executed at the start of measurement at each instrument point.

When the worker inputs an instruction to perform error prediction, the processing starts. In step S01, the environment data receiving unit 11 receives environment data in the surveying site from the environment sensor 22.

Next, in step S02, the error prediction unit 12 reads out the error prediction model M from the storage unit 26, inputs the environment data 91 into the error prediction model $M_1$, and predicts an error in measurement which will occur under the current environment. The error prediction model $M_1$ needs not necessarily be stored in the storage unit 26 and may be configured to be acquired from an external device such as a management server via the communication unit 25 when needed.

Next, in step S03, the error prediction unit 12 determines whether the predicted error exceeds a preset allowable value. The allowable value is a value that ensures that the measurement accuracy is determined in accordance with the model.

If the predicted error does not exceed the allowable value (No), the processing is terminated. If the predicted error exceeds the allowable value (Yes), the process shifts to step S04, in which the display creation unit 13 creates the display data (display image) 94 for displaying a predicted error 93 on the display unit 23. Next, in step S05, the display unit 23 displays the display data 94. The processing is then terminated. Note that in step S05, the error prediction unit 12 may output the display data to an external display device via the communication unit and display the display data 94 instead of or in addition to displaying the display data 94 on the display unit 23. In this case, the external display device includes at least a display unit such as a liquid crystal display, a storage unit for storing the display data 94, a communication unit that is communicable with the surveying instrument 1, and a control unit that controls display.

Figure 9A:
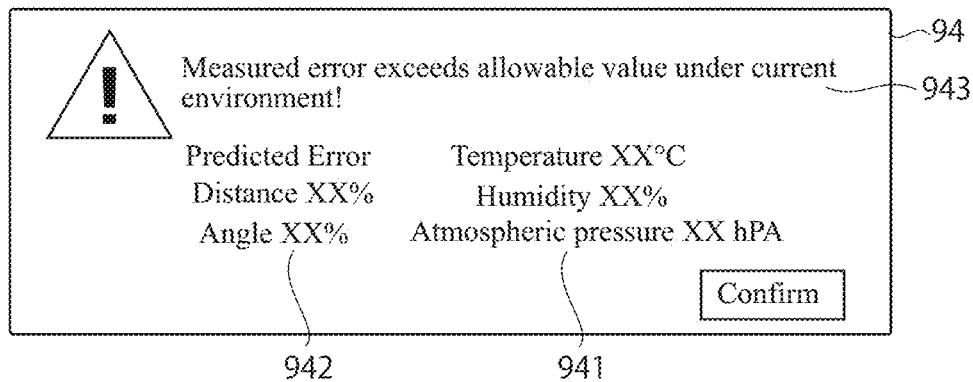
FIGS. 9A to 9C are views each illustrating an example of display data indicating a predicted error obtained by the error prediction apparatus.
Figure 9B:
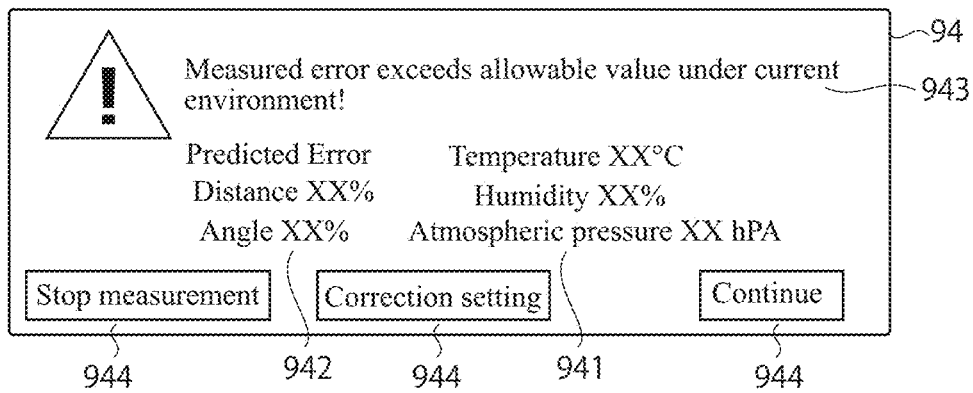
Figure 9C:
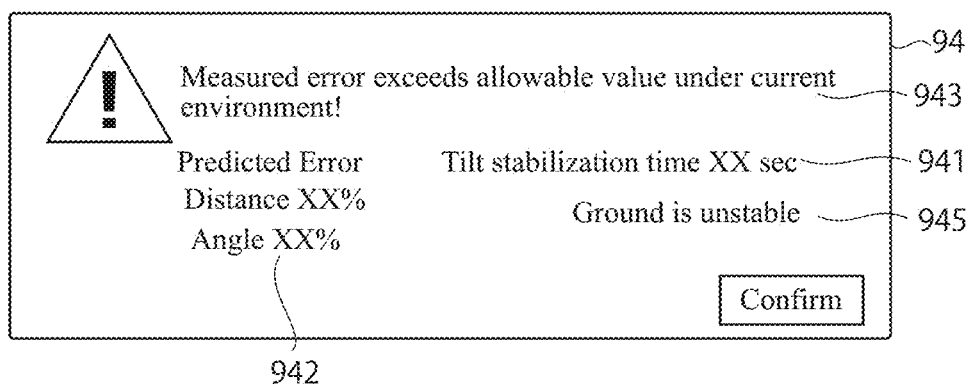

FIGS. 9A through 9C each illustrate an example of the display data 94 for displaying the predicted error 93 on the display unit 23. FIGS. 9A and 9B each are an example of using internal temperature data, internal humidity data, and internal atmospheric pressure data illustrated in FIG. 5 as environment data. FIG. 9C illustrates an example of using tilt stabilization time data as environment data. As illustrated in FIGS. 9A to 9C, the display data 94 indicates values 941 of the environment data 91 and values 942 of the predicted error 93. The display data 94 serves to display a message 943 that alerts the worker that the predicted error exceeds the allowable value in measurement under that environment. As illustrated in FIG. 9A, the display data 94 may be configured such that when the worker confirms "Confirm" by, for example, pressing the enter key of the operation unit 24, the window of the display data 94 is closed so as to only notify the worker that the predicted error exceeds the allowable value in measurement under that environment.

This allows the worker to recognize that the measurement error exceeds the allowable value under that environment and determine, for example, whether to stop or continue the measurement. Alternatively, as illustrated in FIG. 9B, the display data 94 may display selection buttons 944 indicating, as options, "measurement stop" as an instruction to stop measurement, "correction setting" as an instruction to adjust a correction method in accordance with the magnitude of an error, and "measurement continuation" as an instruction to continue measurement with recognition that the measurement includes an error exceeding the allowable value.

As illustrated in FIG. 9(C), the display data 94 may present a display 945 of a message indicating a state indicated by a value of the environment data 91 in addition to or instead of the value of the environment data 91. For this purpose, the storage unit 26 may store messages corresponding to the numerical values of the environment data 91 in the form of a table or the like. This configuration allows the worker to easily grasp the state indicated by the numerical value of the environment data 91. If there are a plurality of types of environment data 91, the display data 94 may include the values of all the environment data 91 and displays indicating the states indicated by the values of the environment data 91.

As described above, the error prediction apparatus according to this embodiment is configured to predict an error that will occur under an environment of a surveying site before the actual measurement and create the display data 94 for displaying the predicted error 93, thereby allowing the worker to recognize the error that will occur at the time of measurement before the measurement. This makes it possible to avoid unnecessary measurement such as measurement that ends up discarding measurement values after the measurement.

This embodiment is configured to predict an error in consideration of various environment data 91. The surveying instrument disclosed in Patent Literature 1 executes measurement under various conditions with varying temperatures when calculating such errors and calculates mathematical expressions for correction. Measurement for this purpose is generally performed with other environment parameters fixed. However, factors for errors in measurement values depend on not only the temperature but also the other environment parameters. In addition, for example, the ambient temperature around the surveying instrument 1 influences the speed of light and becomes a factor for a measurement error. The ambient temperature also causes thermal expansion of the tripod on which the surveying instrument 1 is installed and becomes a factor for an angle measurement error. In this manner, one environment parameter sometimes acts in various manners and becomes a factor for errors. In addition, error variations caused by environmental factors sometimes act independently for each of the factors and sometimes influence each other to appear as a synergistic effect. An error calculation method set independently for each of the environment parameters (a type of environment data) cannot respond to error variation appearing as such a synergistic effect.

In this embodiment, the error prediction model M is created by using a plurality of types of environment data 91 and error data 92 as teacher data. Performing error prediction by using the error prediction model M can predict an accurate error in accordance with the environment in consideration of the complex relationships between environment parameters.

In addition, since the error prediction apparatus according to this embodiment is configured as the surveying instrument 1, an error can be predicted and the predicted error 93 can be displayed only by the surveying instrument 1, and the worker does not need anything other than the surveying instrument 1 used for surveying work. This prevents an increase in load on the worker.

II. Second Embodiment

1. Error Prediction Apparatus

Figure 10:
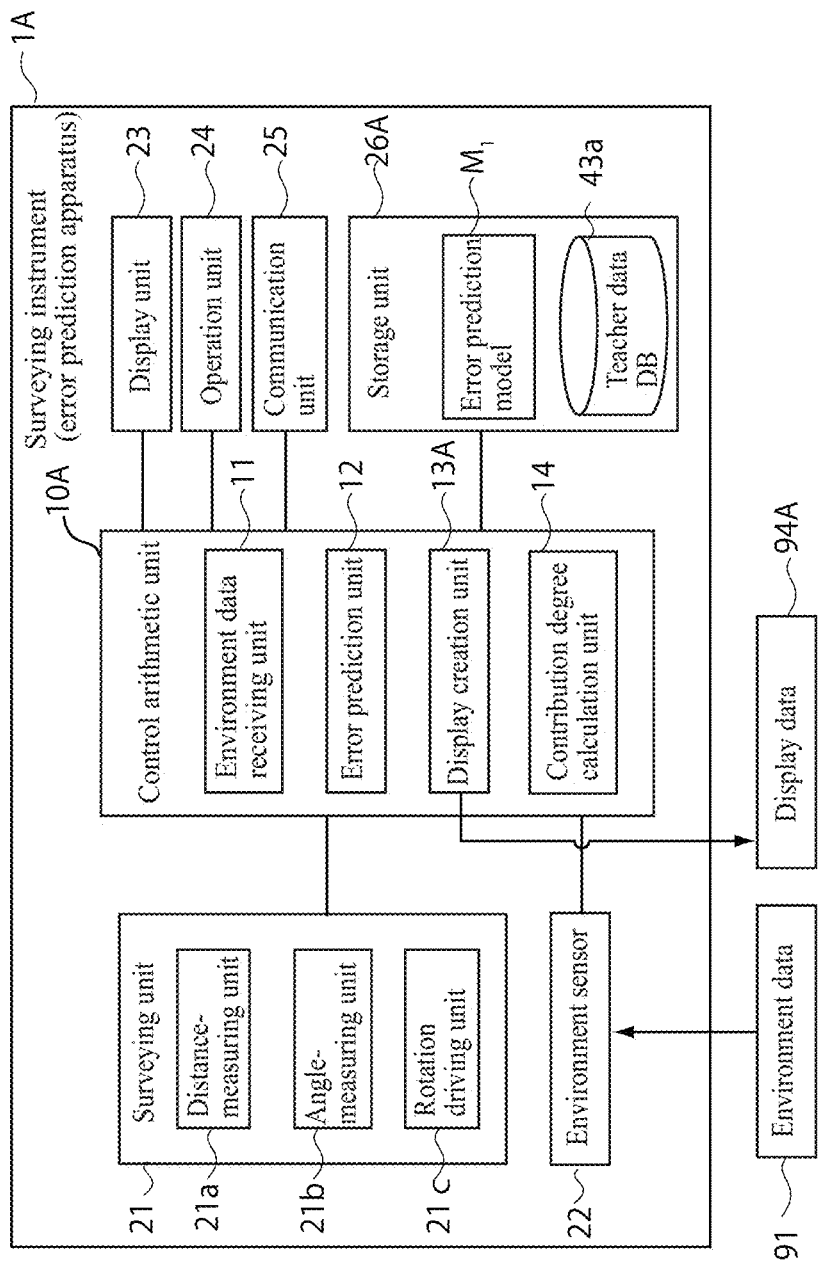
FIG. 10 is a block diagram illustrating the configuration of a surveying instrument as an error prediction apparatus according to a second embodiment.

FIG. 10 is a block diagram illustrating the configuration of a surveying instrument 1A as an error prediction apparatus according to the second embodiment, which is one modification of the first embodiment. Although the surveying instrument 1A includes almost the same hardware configuration as that of the surveying instrument 1, a control arithmetic unit 10A includes a contribution degree calculation unit 14 and also includes a display creation unit 13A instead of the display creation unit 13. In addition, a storage unit 26A includes a teacher data DB 43a used for the creation of an error prediction model $M_1$.

The contribution degree calculation unit 14 calculates, for a predicted error 93 predicted by the error prediction unit 12 by using the error prediction model $M_1$, a contribution degree of each environment data 91 with respect to the predicted error 93. A contribution degree is obtained by, for example, performing approximation by a linear regression method such as local interpretable model-agnostic explanations (LIME) using the data set in the teacher data DB 43a used for the creation of the error prediction model $M_1$.

Alternatively, Shapley additive explanation (SHAP) values obtained by using cooperative game theory may be calculated as a value indicating the contribution degree of environment data.

The contribution degree calculation unit 14 may use, for example, a permutation importance obtained by rearranging explanatory variables, which is disclosed in Japanese Published Unexamined Patent Application No. 2019-121162, as an index indicating the contribution degree of environment data. In addition, as the contribution degree of environment data, a general index may be used, which is used to reduce a feature amount by using a recursive feature elimination technique.

The display creation unit 13A creates display data 94A in relation to the predicted error 93 and including a display corresponding to the contribution degree calculated by the contribution degree calculation unit 14 in addition to the predicted error 93.

2. Error Prediction Method

Figure 11:
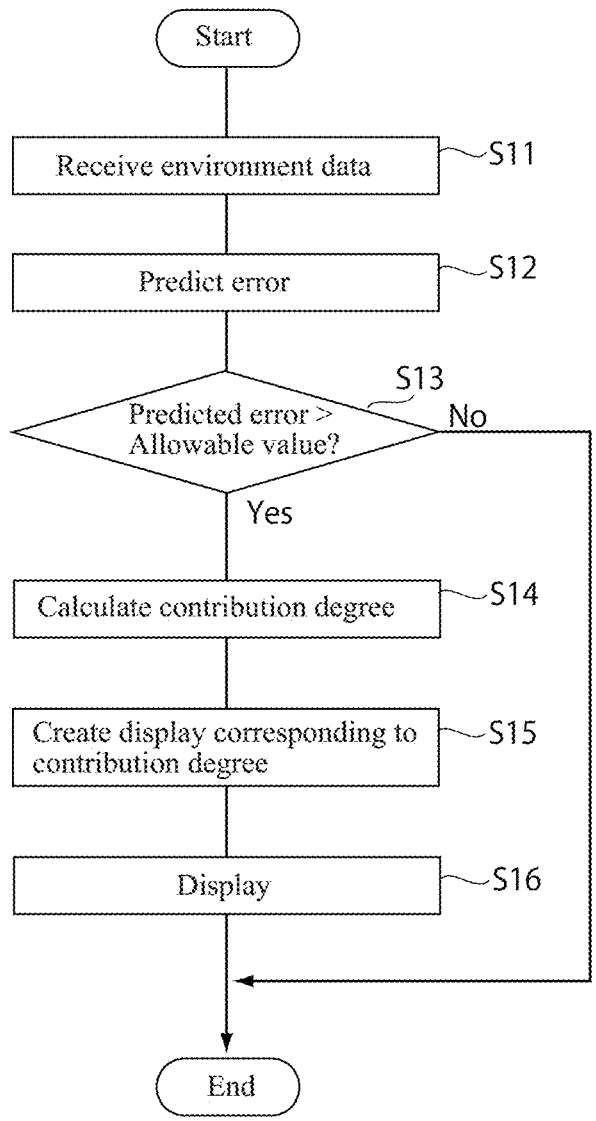
FIG. 11 is a flowchart of processing for error prediction by the same error prediction apparatus.

FIG. 11 is a flowchart of processing by an error prediction method by the surveying instrument 1 according to this embodiment. FIG. 12 illustrates an example of teacher data used in this method. As in the first embodiment, environment data may include at least one of the environment data exemplarily illustrated in FIG. 3, but the environment data 91 may include all the environment data exemplarily illustrated in FIG. 3, as illustrated in FIG. 12.

Assume that the worker inputs an instruction to perform error prediction. In this case, in steps S11 to S13, as in steps S01 to S03, an environment data receiving unit 11 receives environment data from an environment sensor 22, the error prediction unit 12 reads out the error prediction model $M_1$ from the storage unit 26A and inputs the environment data 91 into the error prediction model $M_1$, thereby predicting the predicted error 93 and determining whether the predicted error 93 exceeds an allowable value.

If the predicted error does not exceed the allowable value (No), the processing is terminated. If the predicted error exceeds the allowable value (Yes), the process shifts to step S14, in which the contribution degree calculation unit 14 calculates the contribution degree of the environment data 91 with respect to the predicted error 93, which is predicted by using the error prediction model $M_1$.

FIG. 13 illustrates an example of the calculation result obtained by the contribution degree calculation unit 14. The contribution degree calculation unit 14 calculates the contribution degree of each environment data 91 with respect to the predicted error 93.

Figure 14A:
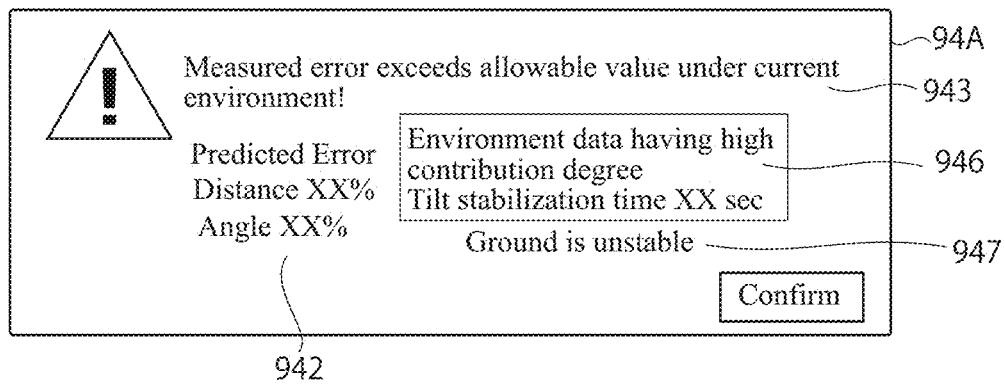
FIGS. 14A to 14C are views each illustrating an example of display data indicating a predicted error obtained by the error prediction apparatus.
Figure 14B:
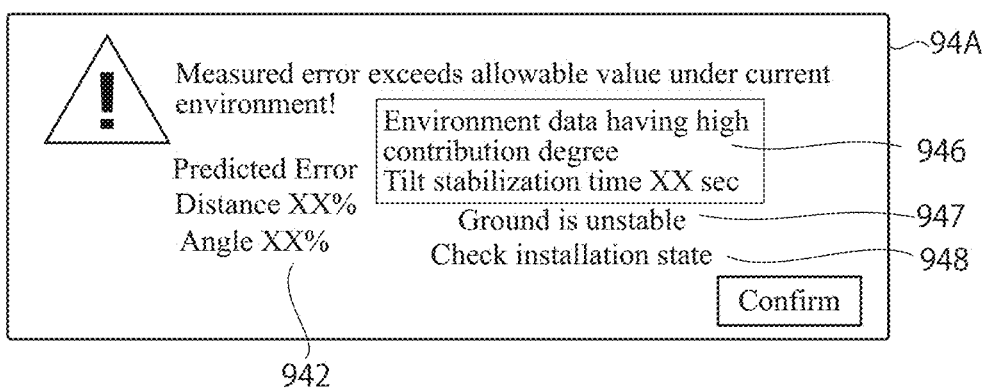

Next, in step S15, the display creation unit 13A creates the display data 94A for displaying information in relation to the predicted error. FIGS. 14A and 14B each illustrates an example of the display data 94A. As illustrated in FIG. 14A, the display data 94A includes a display 946 of the type and value of the environment data 91 having a high contribution degree in addition to a value 942 of the predicted error 93 and the alert message 943. The display data 94A may include a message 947 indicating the state indicated by the environment data 91 in addition to the display 946 or instead of the display 946.

In addition, as illustrated in FIG. 14B, the display data 94A may further include a message 948 notifying countermeasures to cancel the state indicated by the environment data 91. For this purpose, the storage unit 26A may store the data of a message for notifying countermeasures to cancel the state indicated by the environment data 91 in correspondence with the contribution degree distribution of the environment data 91.

Figure 14C:
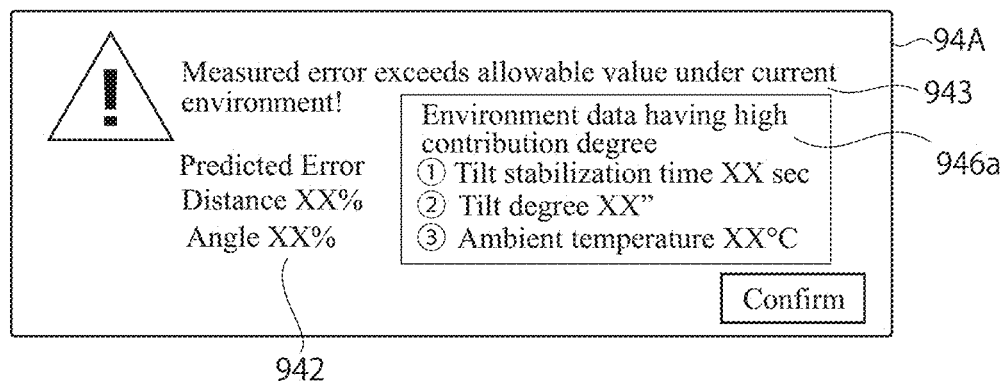

As illustrated in FIGS. 14A and 14B, as the environment data 91 with a contribution degree, only one environment data 91 serving as a factor most influencing an error may be displayed. Alternatively, as illustrated in FIG. 14C, a plurality of higher order (for example, within the third place) environment data 91 serving as factors influencing an error may be displayed.

This embodiment is provided with the contribution degree calculation unit 14 to identify the environment data 91 having a high contribution degree to an error among factors influencing an error, thereby making the display data 94A include the display 946 in relation to the environment data 91 having the high contribution degree in addition to the predicted error 93. This allows the worker to grasp in advance the occurrence of an error that is likely to occur and its factor without executing measurement or performing detailed analysis. As a result, the worker can take measures to prevent the occurrence of an error before the execution of measurement.

In particular, in a state in which it is difficult for the worker to identify a cause of an error, as in an environment state in which the installation surface is slightly unstable in a boundary region in a temperature range allowing measurement, it is possible to create data that indicates which has a higher contribution degree and how to deal with. Displaying such data allows the worker to easily grasp a factor for an error that is likely to occur under the current situation.

In addition, if the display data 94A is configured to include the message 948 notifying countermeasures to cancel the state indicated by the environment data 91, the worker can take measures to prevent the occurrence of an error in advance without requiring expert knowledge.

III. Third Embodiment

1. Error Prediction Apparatus

Figure 15:
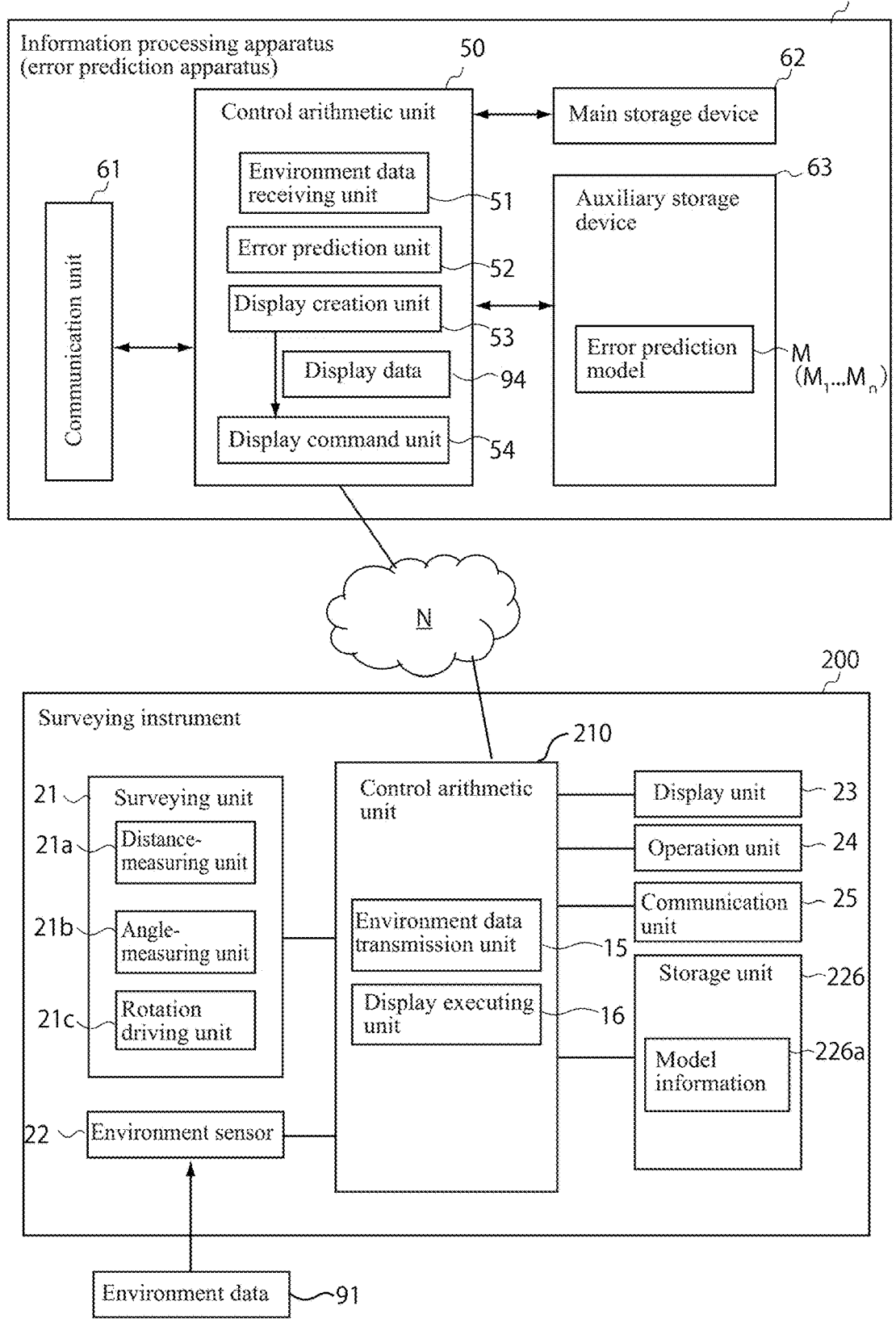
FIG. 15 is a block diagram illustrating the configuration of an information processing apparatus as an error prediction apparatus according to a third embodiment.

FIG. 15 is a block diagram illustrating the configuration of an error prediction apparatus according to the third embodiment. The error prediction apparatus is formed as an information processing apparatus 5 communicably connected to a surveying instrument 200 of the same model as that of a surveying instrument 1 via a communication network N.

The information processing apparatus 5 includes a control arithmetic unit 50, a communication unit 61, a main storage device 62, and an auxiliary storage device 63. The control arithmetic unit 50, the communication unit 61, the main storage device 62, and the auxiliary storage device 63 respectively have the same hardware configurations as those of the control unit 30, the communication unit 41, the main storage device 42, and the auxiliary storage device 43 of the error prediction model generating device 3, and hence a description of the configurations will be omitted.

The auxiliary storage device 43 stores error prediction models M ($M_1$ to $M_n$) corresponding to various models.

The information processing apparatus 5 may be a computer constituting a management server MS.

The control arithmetic unit 50 includes, as functional units, an environment data receiving unit 51, an error prediction unit 52, a display creation unit 53, and a display command unit 54.

The environment data receiving unit 51 receives environment data 91 detected by an environment sensor 22 of the surveying instrument 200 via the communication network N in association with the model information of the surveying instrument 200.

The error prediction unit 52 inputs the received environment data 91 into an error prediction model (the error prediction model $M_1$ in this case) in relation to the model corresponding to the model information associated with the environment data 91 to predict a predicted error 93 that occurs in the measurement value of the surveying instrument 200 under the environment of the surveying site.

The display creation unit 53 creates display data 94 for displaying the predicted error 93. The display command unit 54 commands the surveying instrument 200 to display the display data 94 via the communication network N.

The surveying instrument 200 is a surveying instrument of the same model as that of the surveying instrument 1 and has the same hardware configuration as that of the surveying instrument 1 except for the following points.

A control arithmetic unit 210 includes, as functional units, an environment data transmission unit 15 and a display executing unit 16 without including the environment data receiving unit 11, the error prediction unit 12, and the display creation unit 13. In addition, a storage unit 226 includes model information 226a indicating the model of the surveying instrument 200 without including the error prediction model $M_1$.

The environment data transmission unit 15 transmits the environment data 91 acquired by the environment sensor 22 to the information processing apparatus 5 while associating the data with the model information 226a in accordance with an instruction from the worker.

The display executing unit 16 displays the display data received from the information processing apparatus 5 on a display unit 23 in accordance with a display instruction from the information processing apparatus 5.

2. Error Prediction Method

Figure 16:
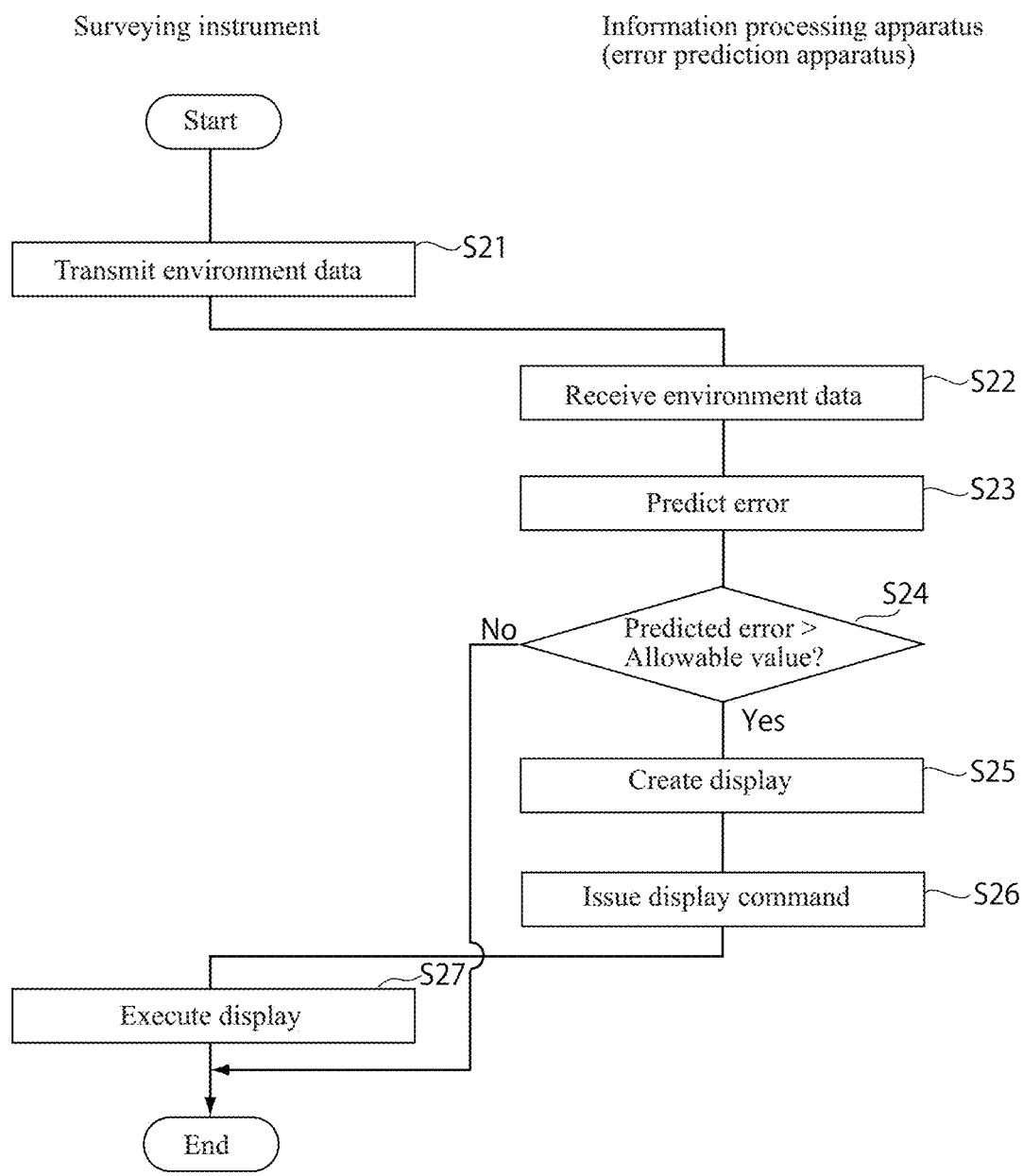
FIG. 16 is a flowchart of processing for error prediction by the same error prediction apparatus.

FIG. 16 is a flowchart of an error prediction method using the information processing apparatus 5 as the error prediction apparatus according to the third embodiment.

When the worker inputs an instruction to perform error prediction from the surveying instrument 200, the processing starts. In step S21, the environment data transmission unit 15 transmits the environment data 91 in the surveying site to the information processing apparatus 5 detected by the 22 in association with the model information 226a.

Next, in step S22, the environment data receiving unit 51 receives the environment data 91.

Next, in step S23, the error prediction unit 52 reads out the error prediction model $M_1$ corresponding to the model information 226a associated with the environment data 91 from the storage unit 226, inputs the environment data 91 into the error prediction model $M_1$, and predicts an error in measurement which will occur under the environment of the surveying site.

Next, in step S24, the error prediction unit 52 determines whether the predicted error 93 exceeds a preset allowable value.

If the predicted error 93 does not exceed the allowable value (No), the processing is terminated. If the predicted error 93 exceeds the allowable value (Yes), the process shifts to step S25, in which the display creation unit 53 creates the display data 94 for displaying the predicted error 93 on the display unit 23. Next, in step S26, the display command unit 54 transmits a command for displaying the display data 94 to the surveying instrument 200.

Next, in step S27, the display executing unit 16 of the surveying instrument 200 displays the display data 94 on the display unit 23 in accordance with the display command and then terminates the processing.

As described above, the information processing apparatus 5 connected to the surveying instrument via the communication network N is provided with the error prediction unit 12 and the error prediction models M instead of providing them in the surveying instrument. Even in this configuration, effects similar to those of the error prediction apparatus according to the first embodiment can be obtained by making the information processing apparatus 5 on the communication network N perform prediction based on the environment data 91 acquired by the surveying instrument 200 in the surveying site.

In general, it is easy to configure the information processing apparatus 5 including a control arithmetic unit having higher performance than that in the surveying instrument 200, and hence it is possible to reduce the load of arithmetic processing in the surveying instrument 200.

IV. Fourth Embodiment

1. Error Prediction Apparatus

Figure 17:
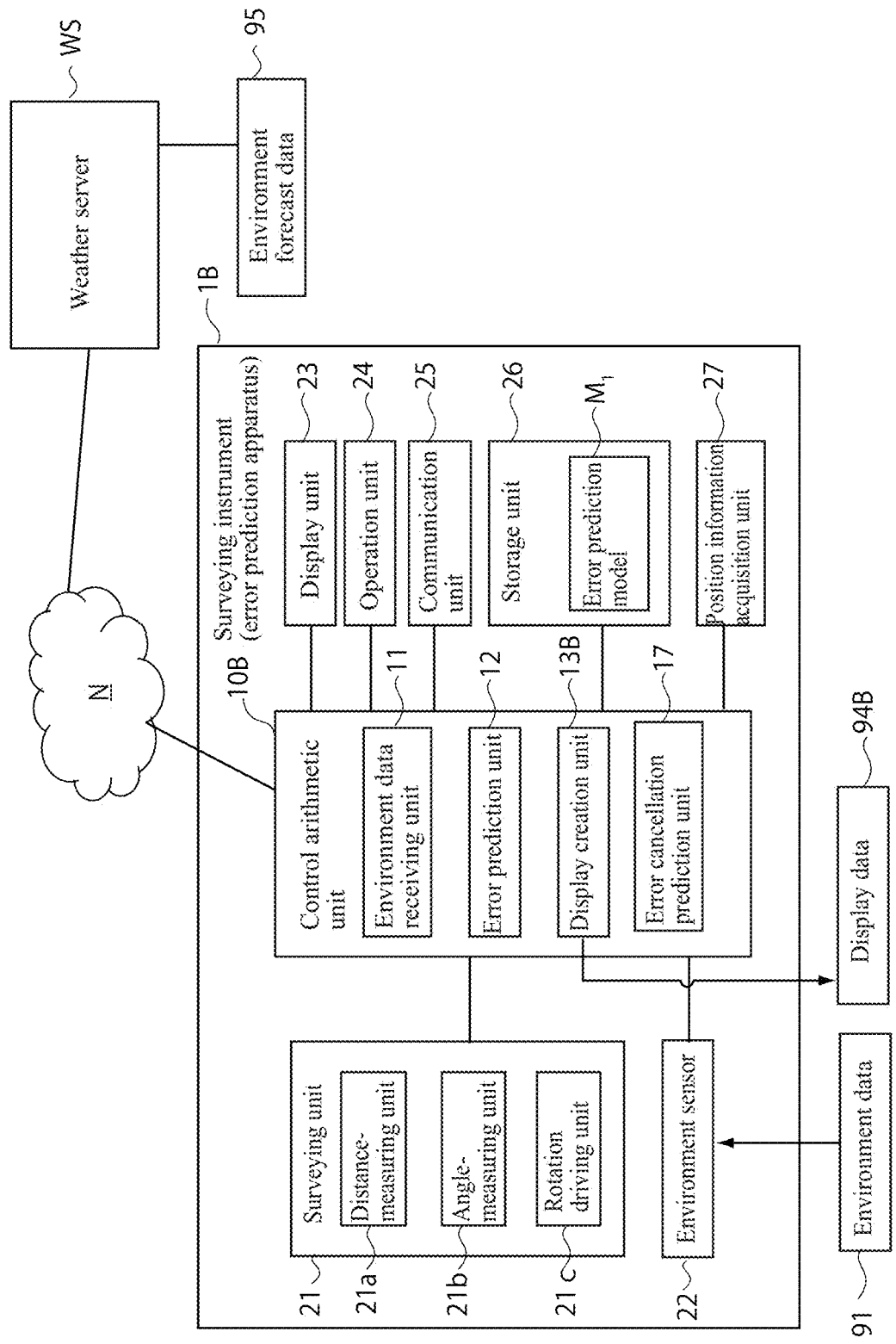
FIG. 17 is a block diagram illustrating the configuration of a surveying instrument as an error prediction apparatus according to a fourth embodiment.

FIG. 17 is a block diagram illustrating the configuration of a surveying instrument 1B as an error prediction apparatus according to the fourth embodiment. Although the surveying instrument 1B includes almost the same hardware configuration as that of the surveying instrument 1, the surveying instrument 1B differs from the surveying instrument 1 in that the surveying instrument 1B further includes a position information acquisition unit 27, a control arithmetic unit 10B includes an error cancellation prediction unit 17 and also includes a display creation unit 13B instead of the display creation unit 13. In addition, the surveying instrument 1B is connected to a weather server WS via a communication network N.

The weather server WS is, for example, a server managed by a weather information provider. It is possible to acquire environment forecast data 95 related to meteorological phenomena such as weather, temperature, humidity, and atmospheric pressure in each area from the weather server WS at, for example, predetermined time intervals such as 30-min intervals.

The position information acquisition unit 27 is, for example, a GNSS receiver, which can acquire position information of the surveying instrument 1B. Position information may be otherwise acquired by making the worker input the address of the current location of the surveying instrument 1B via an operation unit 24.

The error cancellation prediction unit 17 acquires the environment forecast data 95 of an area round the current position of the surveying instrument 1B from the weather server WS, determines, based on the environment forecast data 95, the time when the predicted error does not exceed the allowable value, that is, the predicted error falls within the allowable value, and includes the time in display data 94B for displaying a predicted error 93.

2. Error Prediction Method

Figure 18:
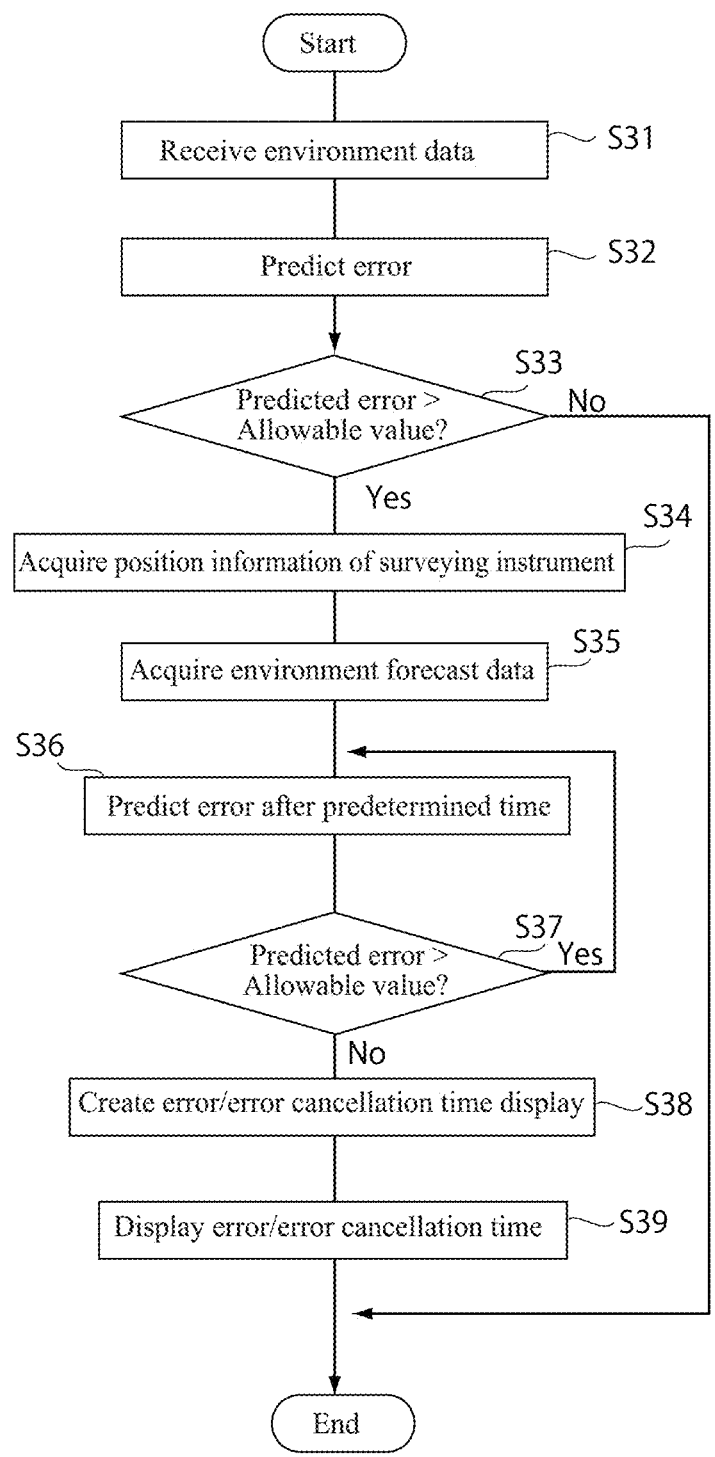
FIG. 18 is a flowchart of processing for error prediction by the same error prediction apparatus.

FIG. 18 is a flowchart of an error prediction method using the surveying instrument 1B as the error prediction apparatus according to the fourth embodiment.

The processing in steps S31 to S33 is the same as that in steps S01 to S03, and hence a description of the processing will be omitted. If it is determined in step S33 that the predicted error exceeds the allowable value (Yes), the process shifts to step S34, in which the error cancellation prediction unit 17 acquires the position information of the surveying instrument 1B.

Figures 19, 20:
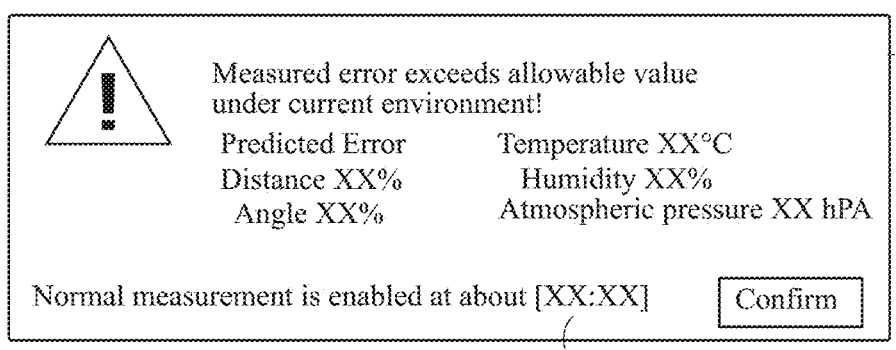
FIG. 19 is a view illustrating an example of environment forecast data used in the error prediction apparatus.
FIG. 20 is a view illustrating an example of display data in the error prediction apparatus.

Next, in step S35, the error cancellation prediction unit 17 acquires the environment forecast data 95 in a peripheral area of the current position of the surveying instrument 1B, that is, the surveying site, by an amount corresponding to a predetermined time (for example, 6 hours) from the weather server WS. FIG. 19 illustrates an example of the acquired environment forecast data 95. The environment forecast data 95 is, for example, forecast values such as temperature, humidity, and atmospheric pressure related to weather obtained at 30-min intervals. For example, when the current time is 12 hr 15 min, forecast values corresponding to 6 hours from 12:30 to 18:30 are acquired. In this case, temperature, humidity, and atmospheric pressure data in a peripheral area of a surveying site are considered to correspond to the ambient temperature, ambient humidity, and ambient atmospheric pressure of the surveying instrument 1B. Accordingly, the error cancellation prediction unit 17 acquires the environment prediction data 95 corresponding to environment data 91. That is, when the environment data 91 includes ambient temperature data, ambient humidity data, and ambient atmospheric pressure data, temperature data, humidity data, and atmospheric pressure data are acquired as the environment prediction data 95.

Next, in step S36, the error cancellation prediction unit 17 inputs the environment prediction data 95 of the acquired environment prediction data 95 which is obtained after a predetermined time (for example, 30 minutes), into an error prediction model $M_1$ to predict the predicted error 93 under the environment of the environment prediction data 95 at that time (after 30 minutes).

In step S37, the error cancellation prediction unit 17 determines whether the predicted error 93 exceeds an allowable value. If the predicted error 93 exceeds the allowable value (Yes), the process returns to step S36, in which the environment prediction data 95 after another duration of the predetermined time (that is, for example, after 60 minutes when the predetermined time is 30 minutes) is input into the error prediction model $M_1$ to predict a predicted error under the environment of the environment prediction data 95 at that time.

If it is then determined in step S37 that the predicted error falls within the allowable value (No), the process shifts to step S38, in which the display creation unit 13B creates the display data 94B including the predicted error 93 and a display 949 at the time when the error will be canceled. FIG. 20 illustrates an example of the display data 94B. Then, in step S39, the display data 94B is displayed on the display unit 23, and the processing is terminated.

Assume that determination is performed in step S37 with respect to all the data acquired from the weather server WS. Even in this case, if the predicted error exceeds the allowable value, the display data 94B may be configured to display a message, for example, "proper measurement cannot be performed within the next 6 hours".

As described above, this embodiment is configured to acquire the environment prediction data 95 of a peripheral area of the current position of the surveying instrument 1B from the weather server WS, determine, based on the environment prediction data 95, the time when the predicted error 93 does not exceed the allowable value, that is, the predicted error 93 falls within the allowable value, and display the determination result. As a result, the worker can know how much time the worker will wait until he/she can perform proper surveying when proper surveying cannot be performed under the current environment. This can reduce the load such as wastefully waiting for the recovery of the environment to an environment that allows proper surveying.

V. Fifth Embodiment

Figure 21A:
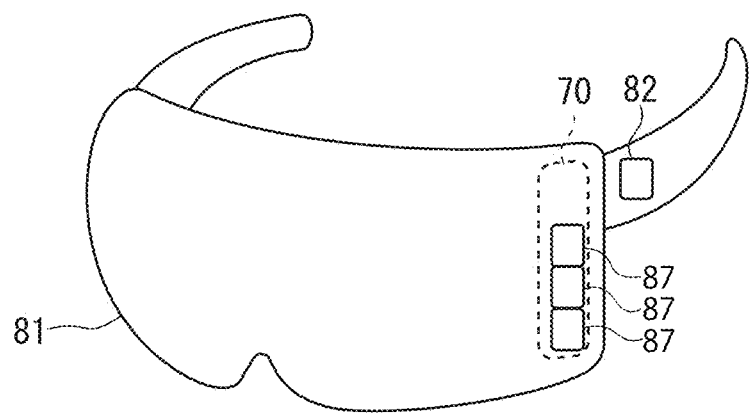
FIGS. 21A and 21B are external schematic views illustrating an eyewear display apparatus as an error prediction apparatus according to a fifth embodiment.
Figure 21B:
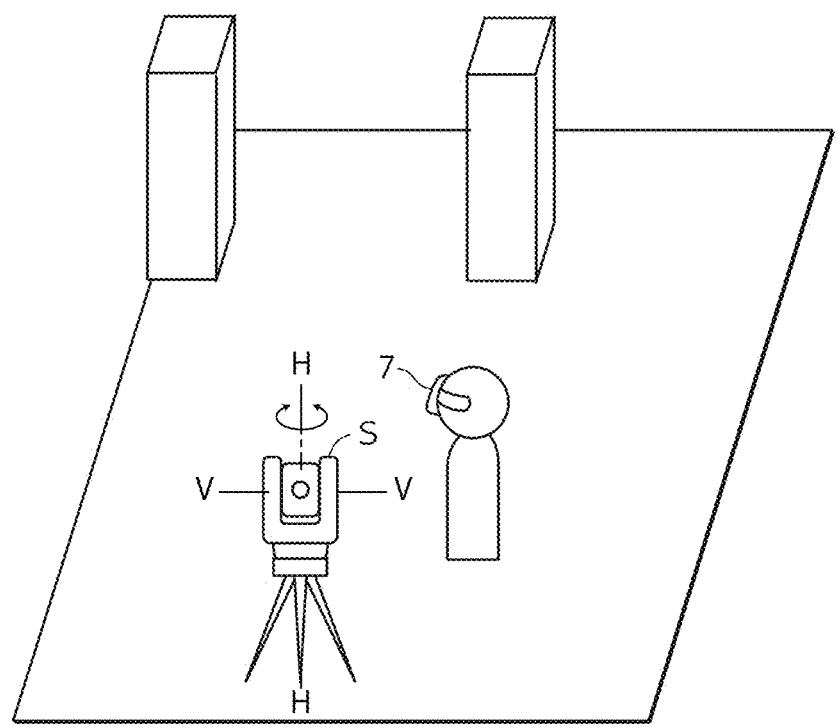

FIG. 21A is an external perspective view of an eyewear display apparatus (referred to as an "eyewear apparatus" hereinafter) 7 as an error prediction apparatus according to the fifth embodiment. FIG. 21B is a view illustrating how a surveying operation is performed by using the eyewear apparatus 7 near a surveying instrument S of the same model as that of a surveying instrument 1 of a surveying site. The eyewear apparatus 7 is a wearable device mounted on the head of the worker.

Figure 22:
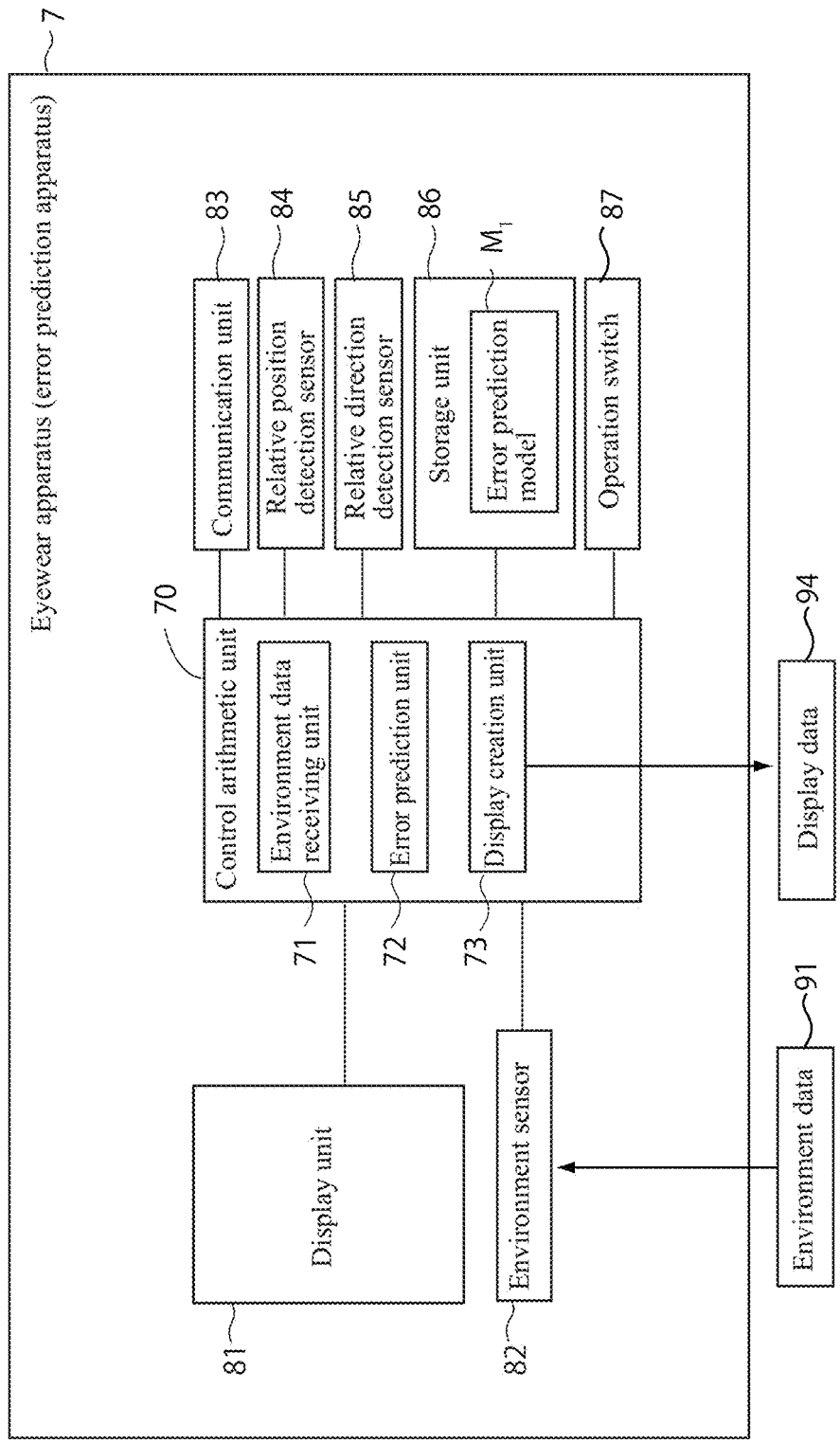
FIG. 22 is a block diagram illustrating the configuration of the same error prediction apparatus.

FIG. 22 is a block diagram illustrating the configuration of the eyewear apparatus 7. The eyewear apparatus 7 includes a control arithmetic unit 70, a display unit 81, an environment sensor 82, a communication unit 83, a relative position detection sensor 84, a relative direction detection sensor 85, a storage unit 86, and operation switches 87.

The display unit 81 is a transmission type display in the form of goggles lens, which covers both eyes of the worker when he/she wears the display. The display unit 81 is, for example, an optically see-through display using a half mirror and configured to display at least a virtual image of display data 94 created by the control arithmetic unit 70 upon superimposing it on a site scene. Alternatively, the display unit 81 may be a video see-through display including a camera (not illustrated) that captures an image of a scene in front of the eyewear apparatus 7 in real time and configured to display an image obtained by superimposing the display data 94 created by the control arithmetic unit 70 on the front scene image captured by the camera. The projection method to be used may be a virtual image projection method or retinal projection method. The display unit 81 displays the display data 94 created by a display creation unit 73.

The environment sensor 82 includes sensors of environment sensors 22 which detect the ambient environment of the surveying instrument, such as an ambient temperature sensor, an ambient humidity sensor, an ambient atmospheric pressure sensor, a visibility sensor, and an anemometer, for example. Accordingly, environment data 91 acquired by the environment sensor 82 is ambient environment data. The communication unit 83 is a communication controller identical to the communication unit 25 and allows transmission/reception of information to/from the surveying instrument S.

The relative position detection sensor 84 detects the position of the eyewear apparatus 7 at an observation site by performing wireless positioning from a GPS antenna, WiFi (registered trademark) access point, ultrasonic oscillator, or the like installed in the observation site.

The relative direction detection sensor 85 is constituted by a combination of a triaxial acceleration sensor or gyro sensor and a tilt sensor. The relative direction detection sensor 85 detects a tilt of the eyewear apparatus 7, with the up-down direction being the Z-axis direction, the left-right direction being the Y-axis direction, and the front-rear direction being the X-axis direction.

The eyewear apparatus 7 is configured to acquire a position and a direction by using the relative position detection sensor 84 and the relative direction detection sensor 85, convert the internal coordinate system of the surveying instrument S installed in the same surveying site by using the reference point and the reference direction set in the measurement site, and manage the converted coordinate system with the coordinate system of the eyewear apparatus 7. This allows the eyewear apparatus 7 to be used in a surveying site for assisting the surveying operation of the surveying instrument S.

The storage unit 86 is, for example, a memory card. The storage unit 86 stores programs for execution of the functions by the control arithmetic unit 70. In addition, the storage unit 86 includes an error prediction model $M_1$ matching the model of the surveying instrument S.

The operation switches 87 are, for example, push buttons provided on the outer surface of the display unit 81 as illustrated in FIG. 21. These buttons allow the worker to turn on/off the power of the eyewear apparatus 7 and input selections, instructions, and the like in accordance with display on the display unit 81.

The control arithmetic unit 70 is, for example, an arithmetic control unit obtained by mounting at least a processor such as a CPU and memories (RAM, ROM, and the like) on an integrated circuit. The control arithmetic unit 70 includes, as functional units, an environment data receiving unit 71, an error prediction unit 72, and the display creation unit 73 which incorporate the same functions as those of the environment data receiving unit 11, the error prediction unit 12, and the display creation unit 13 of the surveying instrument 1.

With the above configuration, using the eyewear apparatus 7 as a display device used for the assistance of a surveying operation near the surveying instrument S makes it possible to display a predicted error in the surveying instrument S used at the same time. This makes it possible to obtain the same effects as those of the first embodiment related to at least the ambient environment of the surveying instrument. In particular, using the eyewear apparatus 7 allows the worker to check an error prediction result even if the worker is not near the surveying instrument S. In addition, the eyewear apparatus 7 may acquire internal environment data acquired by the surveying instrument S, and the environment data receiving unit 71 may receive the internal environment data.

Preferred embodiments of the present invention have been described above, and the embodiments described above are just examples of the present invention, and these can be combined based on the knowledge of a person skilled in the art, and such a combined embodiment is also included in the scope of the present invention. More specifically, the modifications to the error prediction apparatus (surveying instrument 1) according to the first embodiment as in the second and fourth embodiments may be applied to the error prediction apparatus (the information processing apparatus 5) according to the third embodiment and the error prediction apparatus (the eyewear apparatus 7) according to the fifth embodiment.

REFERENCE SIGNS LIST 1, 1A: Surveying instrument (error prediction apparatus)
5: Information processing apparatus (error prediction apparatus)
7: Eyewear display apparatus (error prediction apparatus)
11, 51, 71: Environment data receiving unit
12, 52, 72: Error prediction unit
13, 53, 73: Display creation unit
14: Contribution degree calculation unit
22, 82: Environment sensor
23, 81: Display unit
25, 61, 83: Communication unit
27: Position information acquisition unit
91: Environment data
92: Error data
93: Predicted error
94, 94A, 94B: Display data
95: Environment forecast data
M: Error prediction model
N: Communication network
WS: Weather server

The invention claimed is:

1. An error prediction apparatus comprising a control arithmetic unit including at least one processor and at least one memory, wherein the control arithmetic unit configured to:
receive environment data of a surveying site in which a surveying instrument is installed;
to input the environment data of the surveying site into an error prediction model and predict a predicted error that occurs in a surveying result obtained by the surveying instrument under an environment of the surveying site; and
to create display data for displaying the predicted error when the predicted error exceeds an allowable value, wherein
the error prediction model is a learned model created by machine learning for a surveying instrument of the same model as that of the surveying instrument by using a set of the environment data indicating an environment of the time of surveying and error data in a surveying result as teacher data.

2. The error prediction apparatus according to claim 1, wherein
the error prediction apparatus is configured as the surveying instrument, and wherein
the surveying instrument includes an environment sensor to acquire the environment data and a display unit to display the display data.

3. The error prediction apparatus according to claim 1, wherein the error prediction apparatus is configured as an information processing apparatus configured to be communicable with the surveying instrument via a communication network, and
the surveying instrument includes an environment sensor configured to acquire the environment data and a display unit configured to display the display data.

4. The error prediction apparatus according to claim 1, wherein
the error prediction apparatus is configured as an eyewear display apparatus, and wherein
the eyewear display apparatus includes a display unit configured to display the display data, a communication unit configured to be communicable with the surveying instrument, and an environment sensor configured to acquire the environment data and is configured to display the display data so as to allow observation of the display data while being superimposed on a site scene.

5. The error prediction apparatus according to claim 1, wherein
the environment data includes a plurality of environment data, wherein
the control arithmetic unit is configured to calculate a contribution degree of environment data with respect to the predicted error, and wherein
the display data includes information in relation to the environment data having a high contribution degree of environment data with respect to the predicted error.

6. The error prediction apparatus according to claim 2, wherein
the environment data includes a plurality of environment data, wherein
the control arithmetic unit is configured to calculate a contribution degree of environment data with respect to the predicted error, and wherein
the display data includes information in relation to the environment data having a high contribution degree of environment data with respect to the predicted error.

7. The error prediction apparatus according to claim 3, wherein
the environment data includes a plurality of environment data, wherein
the control arithmetic unit is configured to calculate a contribution degree of environment data with respect to the predicted error, and wherein
the display data includes information in relation to the environment data having a high contribution degree of environment data with respect to the predicted error.

8. The error prediction apparatus according to claim 4, wherein
the environment data includes a plurality of environment data, wherein
the control arithmetic unit is configured to calculate a contribution degree of environment data with respect to the predicted error, and wherein
the display data includes information in relation to the environment data having a high contribution degree of environment data with respect to the predicted error.

9. The error prediction apparatus according to claim 1, further comprising a position information acquisition unit configured to acquire a current position of the surveying instrument, wherein
the apparatus is configured to be communicable with a weather server via a communication network, acquire environment forecast data of a peripheral area of a current position of the surveying instrument from the weather server, determine a time when a value of the predicted error based on the environment forecast data becomes not more than the allowable value, and include the time in the display data.

10. The error prediction apparatus according to claim 2, further comprising a position information acquisition unit configured to acquire a current position of the surveying instrument, wherein
the apparatus is configured to be communicable with a weather server via a communication network, acquire environment forecast data of a peripheral area of a current position of the surveying instrument from the weather server, determine a time when a value of the predicted error based on the environment forecast data becomes not more than the allowable value, and include the time in the display data.

11. The error prediction apparatus according to claim 3, further comprising a position information acquisition unit configured to acquire a current position of the surveying instrument, wherein
the apparatus is configured to be communicable with a weather server via a communication network, acquire environment forecast data of a peripheral area of a current position of the surveying instrument from the weather server, determine a time when a value of the predicted error based on the environment forecast data becomes not more than the allowable value, and include the time in the display data.

12. The error prediction apparatus according to claim 4, further comprising a position information acquisition unit configured to acquire a current position of the surveying instrument, wherein
the apparatus is configured to be communicable with a weather server via a communication network, acquire environment forecast data of a peripheral area of a current position of the surveying instrument from the weather server, determine a time when a value of the predicted error based on the environment forecast data becomes not more than the allowable value, and include the time in the display data.

13. The error prediction apparatus according to claim 5, further comprising a position information acquisition unit configured to acquire a current position of the surveying instrument, wherein
the apparatus is configured to be communicable with a weather server via a communication network, acquire environment forecast data of a peripheral area of a current position of the surveying instrument from the weather server, determine a time when a value of the predicted error based on the environment forecast data becomes not more than the allowable value, and include the time in the display data.

14. An error prediction method comprising the steps of:
by an arithmetic control unit including at least one processor and at least one memory,
acquiring environment data of a surveying site in which a surveying instrument is installed,
inputting the environment data of the surveying site into an error prediction model and predicts a predicted error that occurs in a surveying result obtained by the surveying instrument under an environment of the surveying site, and
creating a display for displaying the predicted error when the predicted error exceeds an allowable value, wherein
the error prediction model is a learned model created by machine learning for a surveying instrument of the same model as that of the surveying instrument by using a set of the environment data indicating an environment of the time of surveying and an error in a surveying result as teacher data.

* * * * *